US006694736B2

United States Patent
Pflüger

(10) Patent No.: US 6,694,736 B2
(45) Date of Patent: *Feb. 24, 2004

(54) TURBOCHARGED INTERNAL COMBUSTION ENGINE

(75) Inventor: Frank Pflüger, Linkenheim-Hochstetten (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/081,259

(22) Filed: Feb. 22, 2002

(65) Prior Publication Data

US 2002/0112478 A1 Aug. 22, 2002

Related U.S. Application Data

(63) Continuation of application No. 09/688,747, filed on Oct. 16, 2000, now Pat. No. 6,378,308, and a continuation-in-part of application No. PCT/EP99/02405, filed on Apr. 9, 1999.

(30) Foreign Application Priority Data

Apr. 16, 1998 (DE) .......................................... 198 16 778
Aug. 21, 1998 (DE) .......................................... 198 37 978

(51) Int. Cl.$^7$ .............................................. F02B 33/44
(52) U.S. Cl. ...................................... 60/612; 123/559.1
(58) Field of Search ........................... 60/612, 624, 602; 123/562, 564, 559.1

(56) References Cited

U.S. PATENT DOCUMENTS

| 3,576,102 | A | * | 4/1971 | West .......................... 60/612 |
| 4,112,684 | A | * | 9/1978 | Tholen ....................... 60/612 |
| 4,930,315 | A | * | 6/1990 | Kanesaka .................... 60/612 |
| 5,063,744 | A | * | 11/1991 | Ishiyama et al. ............ 60/612 |
| 5,142,866 | A | * | 9/1992 | Yanagihara et al. ......... 60/612 |
| 5,199,261 | A | * | 4/1993 | Baker .......................... 60/612 |
| 6,279,320 | B1 | * | 8/2001 | Mailander ................... 60/612 |
| 6,311,493 | B1 | * | 11/2001 | Kurihara et al. ............ 60/612 |
| 6,378,308 | B1 | * | 4/2002 | Pfluger ....................... 60/612 |

FOREIGN PATENT DOCUMENTS

| DE | 3807372 A1 | * | 9/1989 | ........... F02B/37/12 |
| JP | 55109726 A | * | 8/1980 | ........... F02B/37/00 |
| JP | 55109727 A | * | 8/1980 | ........... F02B/37/04 |
| JP | 55109728 A | * | 8/1980 | ........... F02B/37/04 |
| JP | 59150925 A | * | 8/1984 | ........... F02B/37/00 |
| JP | 61164039 A | * | 7/1986 | ........... F02B/37/00 |
| JP | 61200331 A | * | 9/1986 | ........... F02B/37/00 |
| WO | WO 97/22789 A1 | * | 6/1997 | ........... F02D/13/04 |

* cited by examiner

Primary Examiner—Thomas Denion
Assistant Examiner—Thai-Ba Trieu
(74) Attorney, Agent, or Firm—Pendorf & Cutliff; Greg Dziegielewski

(57) ABSTRACT

A turbocharged internal-combustion engine (10), with at least one high-pressure stage (20), with at least one low-pressure stage (30), which is arranged downstream of the high-pressure stage, with bypass piping (24a, 24b) having pipe switch(es) (70, 71), and which connect the exhaust side (12) of the engine with the inlet side of the low-pressure turbine (31) with sensors for detection of the operating parameters of the engine. The high-pressure turbine (21) is continuously flowed through by at least a minimum exhaust mass flow so that it continually circulates, a central processing unit (CPU) is provided, into which signals of the sensors are fed, the CPU actuates the pipe switch (70, 71) in such a way that variable partial flows of the entire exhaust mass flow are distributed to the high-pressure turbine (21), to the low-pressure turbine (31) and optionally to the fresh air side of the engine, and namely in order to optimize the mode of operation of the engine with a view to achieving minimum fuel consumption and/or minimum pollutant emission.

17 Claims, 12 Drawing Sheets

TURBOCHARGED INTERNAL COMBUSTION ENGINE

RELATED APPLICATIONS

This application is a continuation of application Ser. No. 09/688,747 filed Oct. 16, 2000 now U.S. Pat. No. 6,378,308 allowed on Oct. 9, 2001, entitled "Turbocharged Internal Combustion Engine", and a Continuation-In-Part Application of PCT Application No. PCT/EP99/02405 filed Apr. 9, 1999, entitled "Turbocharged Internal Combustion Engine".

BACKGROUND OF THE INVENTION

1. Field of the Invention

The invention relates to a turbocharged internal combustion engine, in particular a turbocharged internal combustion engine with at least one high-pressure and one downstream low-pressure stage, whose turbines are designed as single-flow or double-flow type, as well as with piping that connects the high pressure turbine on the inlet side to the exhaust side of the engine and the outlet side to the low-pressure turbine with at least one bypass channel lockable by means of a pipe switch connecting the exhaust side of the engine on the inlet side to the low-pressure turbine.

2. Description of the Related Art

On such an internal combustion engine with two-stage turbocharging disclosed in DE 195 14 572 A1, a high-pressure stage and a low-pressure stage are arranged in series in a turbocharger in the lower speed range of the internal combustion engine. The exhaust initially flows through the high-pressure turbine and then through the low-pressure turbine. The turbocharging air is first compressed by the low-pressure compressor and then by the high-pressure compressor and fed, after cooling in a heat exchanger, to the fresh-air side of the internal combustion engine. As the rotational speed of the internal combustion engine increases, a changeover can be made to single-stage compression exclusively in the low-pressure compressor in that the high-pressure turbine is completely bypassed by means of an exhaust-side pipe switch and, appropriately, the high-pressure compressor can be fully bypassed via a turbocharging-air-side pipe switch.

A disadvantage of such changeover turbocharging can be seen by the fact that in the event of frequently desired load and speed changes of the internal combustion engine, very often a changeover must be made between one-stage and two-stage mode of operation of the turbocharging unit.

Consequently, there may be a loss of traveling comfort, i.e. unsteady acceleration and braking power response.

A further internal combustion engine according to the preamble is disclosed in DE 39 03 563 C1. Here, too, a changeover is provided from two-stage to one-stage turbocharging. The changeover is affected by means of a pipe switch arranged between the outlet side and the high-pressure turbine. Thus losses in traveling comfort may occur here also.

The same problem is with DE 25 44 471 A1 which features an exhaust gas recirculation (EGR), because the pipe switch is arranged between the outlet side and the high-pressure turbine. A different type of EGR is disclosed in the U.S. Pat. No. 5,142,866, wherein the bypass is located downstream of the high pressure turbine.

SUMMARY OF THE INVENTION

The invention is based on the problem of providing an internal combustion engine which responds to fast load and speed changes without unsteady acceleration and braking power response. The turbocharging pressure is intended, in the case of acceleration—i.e. when the vehicle is to be accelerated—to build up rapidly and be capable of being adapted infinitely and variably to the engine requirements.

This problem is solved by the characteristics described below.

Through the characteristics according to the invention, specifically the following is achieved:

Because there is a continuously flow through the high-pressure turbine at least to a certain extent, and this flow circulates, it is ensured that in the case of acceleration a minimum turbocharging pressure exists and, in particular, the rotational speed of the HP rotor is at a favorable initial level. Furthermore, the individual exhaust mass flows can be supplied to the high-pressure turbine, the low-pressure turbine, or the fresh air side by the arrangements according to the invention with the help of the central processing unit and the pipe switch to the extent desired in each case, so that an optimization of the mode of operation of the engine can be made with respect to minimum fuel consumption and/or minimum pollutant emission.

With corresponding load and increasing rotational speed of the engine, a fast response of the high-pressure turbine is thus ensured in that the expansion work is shifted in the direction of the high-pressure turbine, i.e. through extensive closure of the bypass channel by means of a pipe switch, the largest portion of the exhaust flow is fed to the high-pressure turbine. If, at low load and with small exhaust mass flows, a low-consumption, small load and, above all, exhaust counter pressures are desired in this operating range, the expansion work of the exhaust can for the greater part take place in the low-pressure turbine and possibly by appropriate positioning of the pipe switch via the exhaust return, independently of the rotational speed of the engine by opening the bypass channel.

BRIEF DESCRIPTION OF THE DRAWINGS

Preferred embodiments of the invention are explained in the following sections with reference to the attached drawing. It shows.

DETAILED DESCRIPTION OF THE INVENTION

Figure 1A:
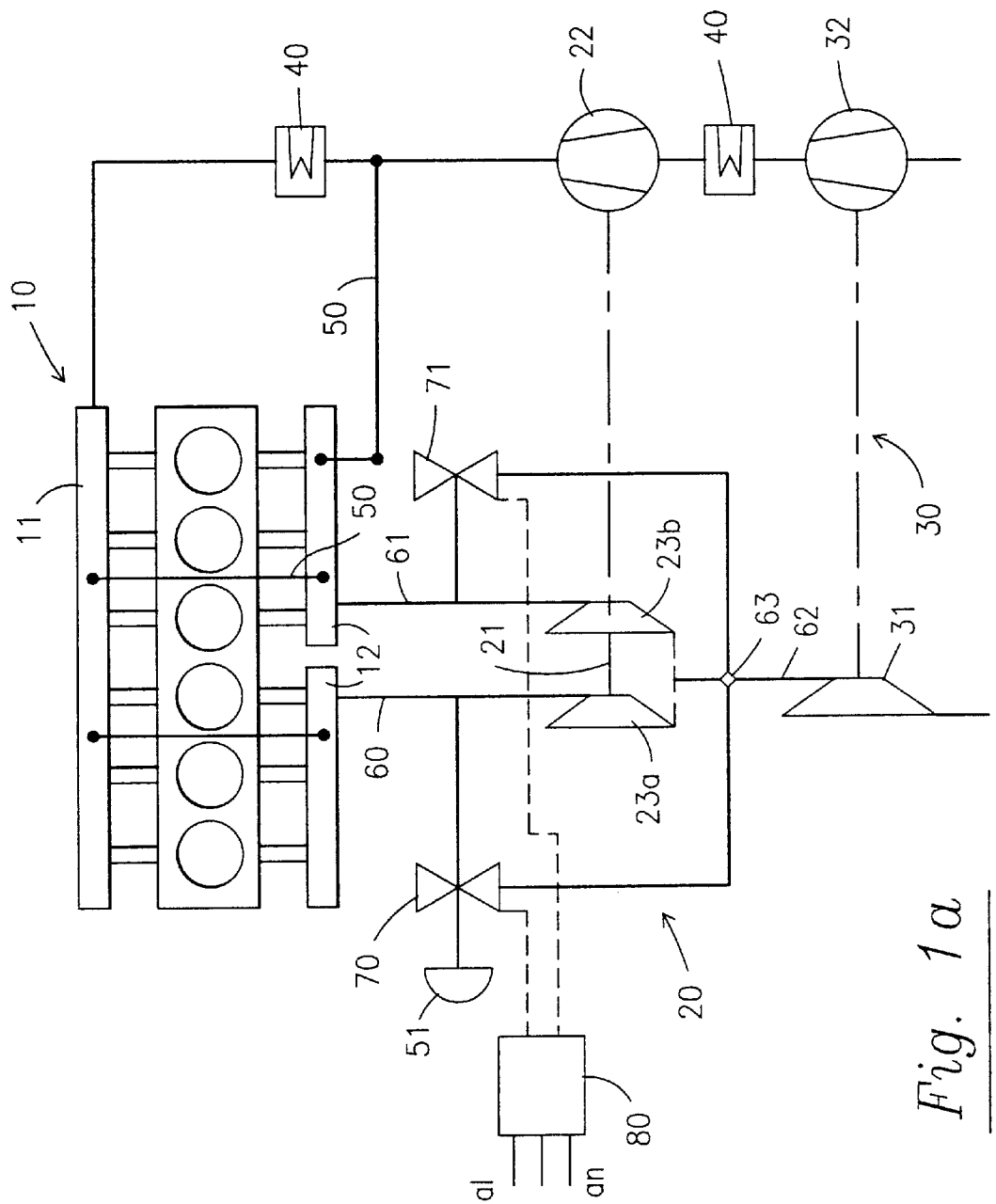
FIG. 1a a flow diagram of the exhaust and fresh-air flow of a two-stage turbocharged diesel internal combustion engine with dual bypass run as preferred for diesel trucks, FIG. 1b a flow diagram of the exhaust flow of a two-stage turbocharged diesel internal combustion engine with common bypass run, FIG. 2 a flow diagram of the exhaust flow of a two-stage turbocharged diesel internal combustion engine with dual bypass run for twin-flow low-pressure turbines, FIG. 3 a flow diagram of the exhaust and fresh-air flow according to FIG. 1a with low-pressure bypass unit, FIG. 4 a flow diagram of the exhaust and fresh-air flow of a two-stage turbocharged diesel internal combustion engine in V shape.

Linked to a motor electronic system, which records the operating characteristics of the engine, such as rotational speeds, mass flows, turbocharging pressures and turbocharging air temperatures, the pipe switches can be controlled for a mode of operation that minimizes consumption or pollutants at any operating point of the engine. As a rule, a trade-off is required between minimal consumption and minimal pollutants. Depending on the ambient conditions, load state and rotational speed, a target-optimized splitting of the exhaust mass flow is made to the fresh air side, the high-pressure turbine, and the low-pressure turbine.

Further advantages can be seen in the fact that, due to the possible distribution of the exhaust flow, the operating lines run in the high-pressure and low-pressure compressor performance characteristics so that on the one hand a high compressor efficiency is reached, and on the other, pumping is virtually excluded under extreme conditions.

In a further embodiment of the invention, a bypass channel, which connects the internal combustion engine to the inlet side of the low-pressure turbine, is not absolutely required. Rather, one of the two turbines—preferably the high-pressure turbine—can also be designed with a corresponding variable turbine geometry, above all with a distributor with adjustable vanes. If, for example, the high-pressure turbine is provided with such a distributor, although the entire mass flow goes through the high-pressure turbine, the rate of this mass flow can be throttled to a greater or less extent.

Additionally, a bypass pipe can be provided, with which the high-pressure turbine can be bypassed, and which has a pipe switch. In this case, too, the distributor is always a little open so that at least a minimum exhaust mass flow flows reliably through the high-pressure turbine so that always at least a minimum turbocharging pressure is present and, in particular, the rotational speed of the HP rotor is at a favorable initial level. By means of the pipe switch, however, there is an additional possibility of control.

At any rate, on the use of one of the two main ideas, the advantage is achieved that different operating parameters of the internal combustion engine can be dealt with in a very sensitive way.

The six-cylinder diesel internal combustion engine 10 in series mode of construction shown in FIG. 1 is turbocharged in two stages via a turbocharger unit. For this purpose, a high-pressure stage 20 is arranged ahead of a single-flow low-pressure stage 30. Via the compressors 22 and 32 driven by the high-pressure turbine 21 and low-pressure turbine 31, fresh air is compressed, cooled down in the two turbocharging-air coolers 40, mixed to a certain percentage ($\geq 0$) with exhaust from an exhaust return flow 50 and fed to the fresh air side 11 of the engine 10. The rotor diameter of the low-pressure turbine 32 is larger than that of the high-pressure turbine 21, with the rotor diameter ratio $d_{L,ND}/d_{L,HD}$ being 1.2 to 1.8 between low-pressure and high pressure turbine. The two flows 23a, b of the twin-flow high-pressure turbine 21 are each connected on the inlet side via a separate pipe 60, 61 with the exhaust side 12 of the engine. On the outlet side, the flows 23a, b are connected via outlet-side pipes 63, 64 to a common pipe 62, which in turn is connected on the inlet side to the single-flow low-pressure turbine 31. One of the two-turbocharging air coolers can, of course, also be omitted.

For optimum adaptation of the turbocharger unit to the operating conditions of the engine 10, a bypass channel 24a and 24b is provided in symmetrical arrangement for each flow 23a, b of the high-pressure turbine 21. Each of these branches off the separate pipe 60 or 61 designed as exhaust elbow, bypass the high-pressure turbine 20 and flow into the common pipe 62 for the same supply to the single-flow low-pressure turbine 30. Each bypass channel 24a, b is provided with a pipe switch 70 or 71 arranged downstream of the branch. These can be integrated in the exhaust elbow or in the housing of the high-pressure turbine and can be designed as slide, valve or flap or similar element and controlled by a CPU both singly and jointly. By means of pipe switches 70 it is possible to increase exhaust back pressure 12 so that pressure 12>11 and EGR can be realized via 50. By means of pipe switch 70 as described before, a splitting of the exhaust flow is possible to the high-pressure turbine 21, the low pressure turbine 31, and exhaust return 50.

In addition, exhaust return pipes 50 are connected, leaving to the fresh air side 11 respectively behind compressor 22. The returned quantity of exhaust can, however, also be fed to any other point of the fresh air side. By means of the pipe switch 70 on the one hand the bypass channel 24a can be closed and, on the other, with opened bypass channel 24a partial flows distributed in the required ratio to the low-pressure turbine 30 and exhaust return pipe 50 (exhaust gas return rate $\geq 0$). Furthermore, for control of the pipe switches 70, 71 and 50 as a function of the operating characteristic variables a1-n, the pipe switches 70, 71 and 50 are connected to an electronic motor control 80, which ensures an optimum distribution of the exhaust mass flow for operation. Through the possible adjustment of different bypass rates 24a, b, an additional degree of freedom is obtained for the distribution of the entire exhaust mass.

Figure 1B:
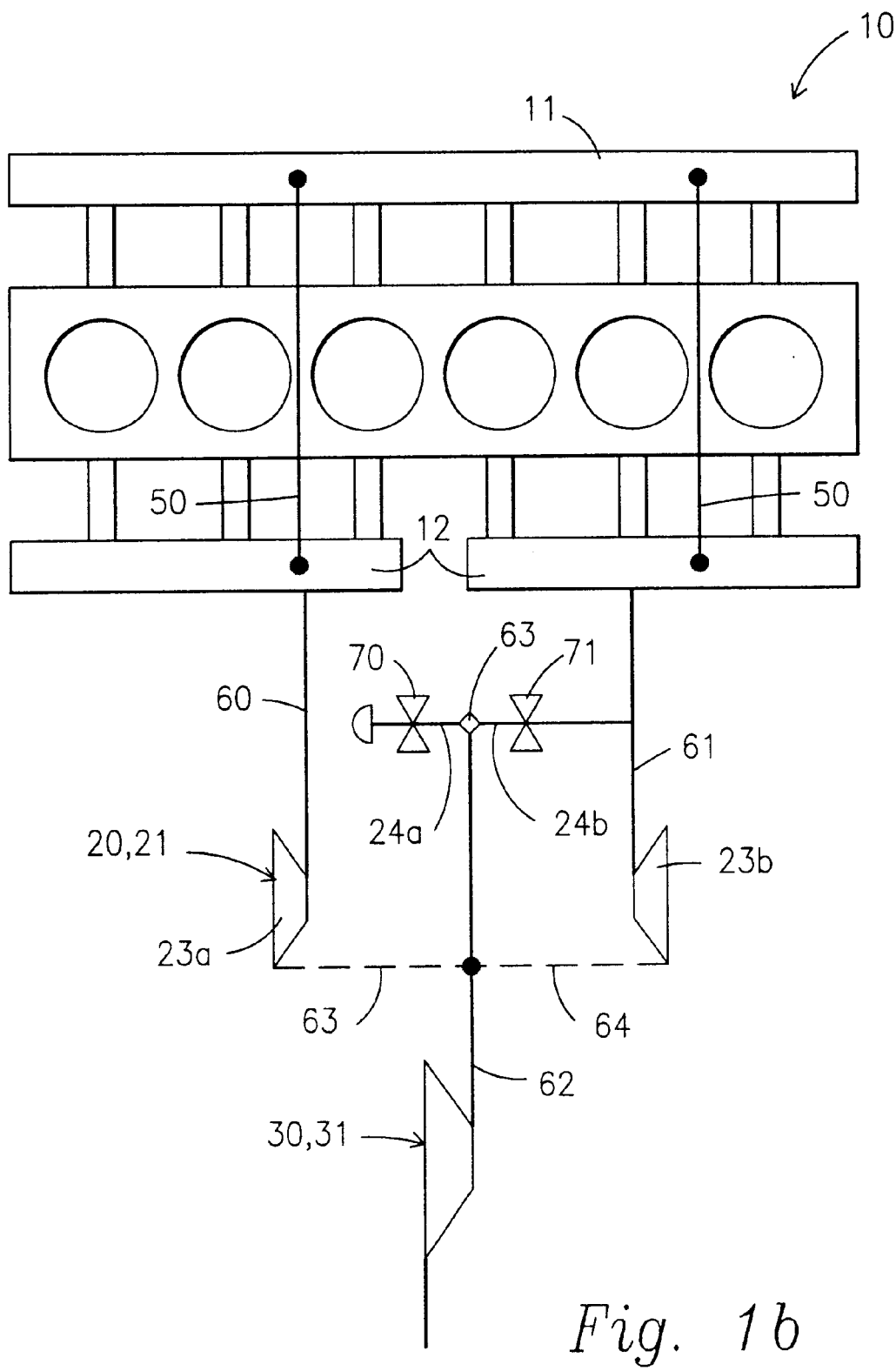

An alternative embodiment of the internal combustion engine 10 is shown in FIG. 1b; this differs from the variant according to FIG. 1a in the design of the turbocharger unit. In this case, the outlet side connection of the high-pressure turbine 21 is provided to the common pipe 62 downstream of the mouth point 63 of the two bypass channels 24a, b, whereas this is designed upstream according to FIG. 1a.

Figure 2:
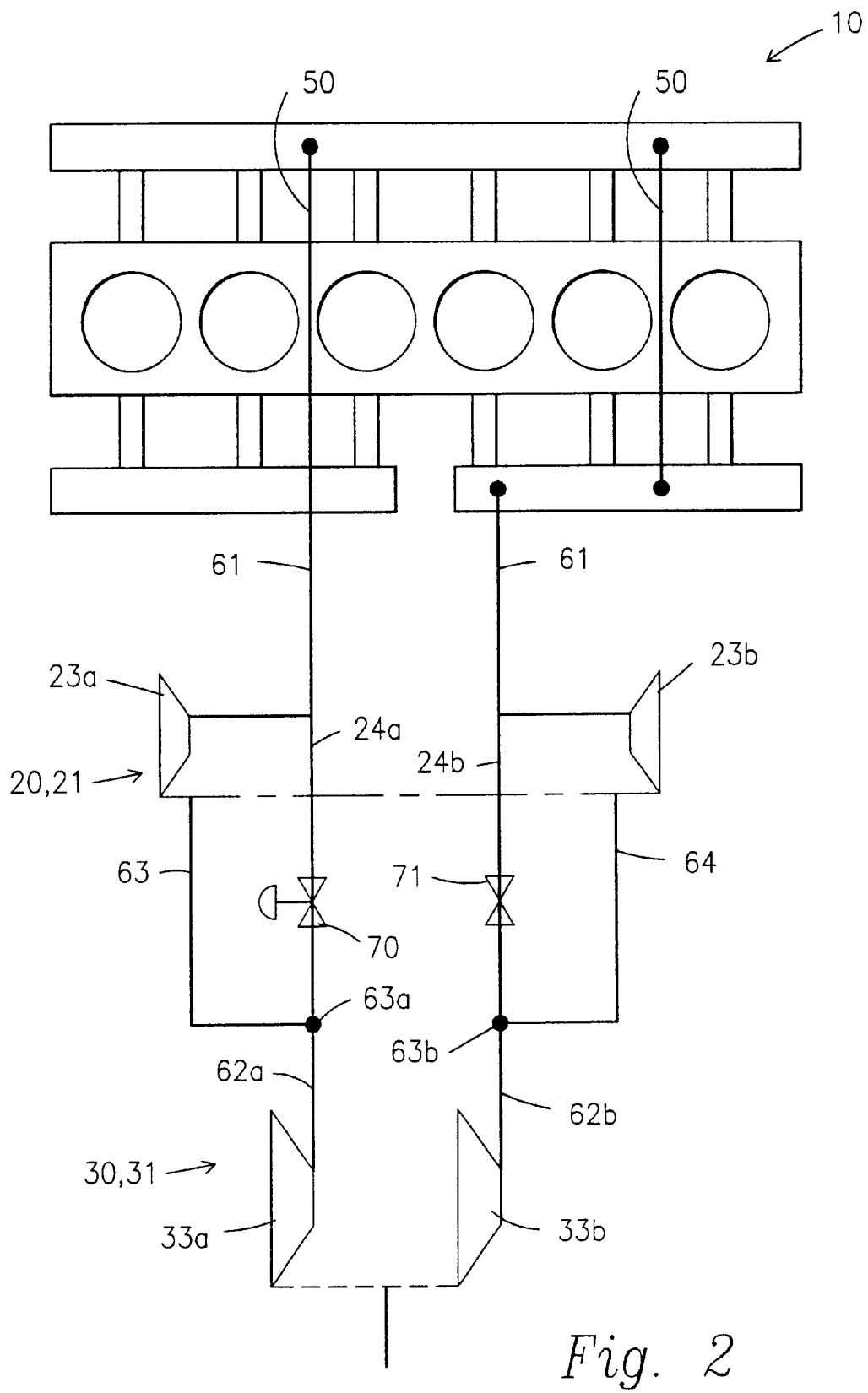

A third variant of the internal combustion engine 10 is represented in FIG. 2. Here, the low-pressure turbine 30 is designed to be double flow. The two channels 33a, b of the low-pressure turbine 31 are each supplied from a separate pipe 62a and 62b and so an uneven admission to the low-pressure turbine is possible. Thus, the bypass channels 24a, b are also each allocated a flow 33a and 33b and, like the flows 23a, b of the high-pressure turbine 21 are each connected separately from each other to the separate pipes 62a and 62b.

Figure 3:
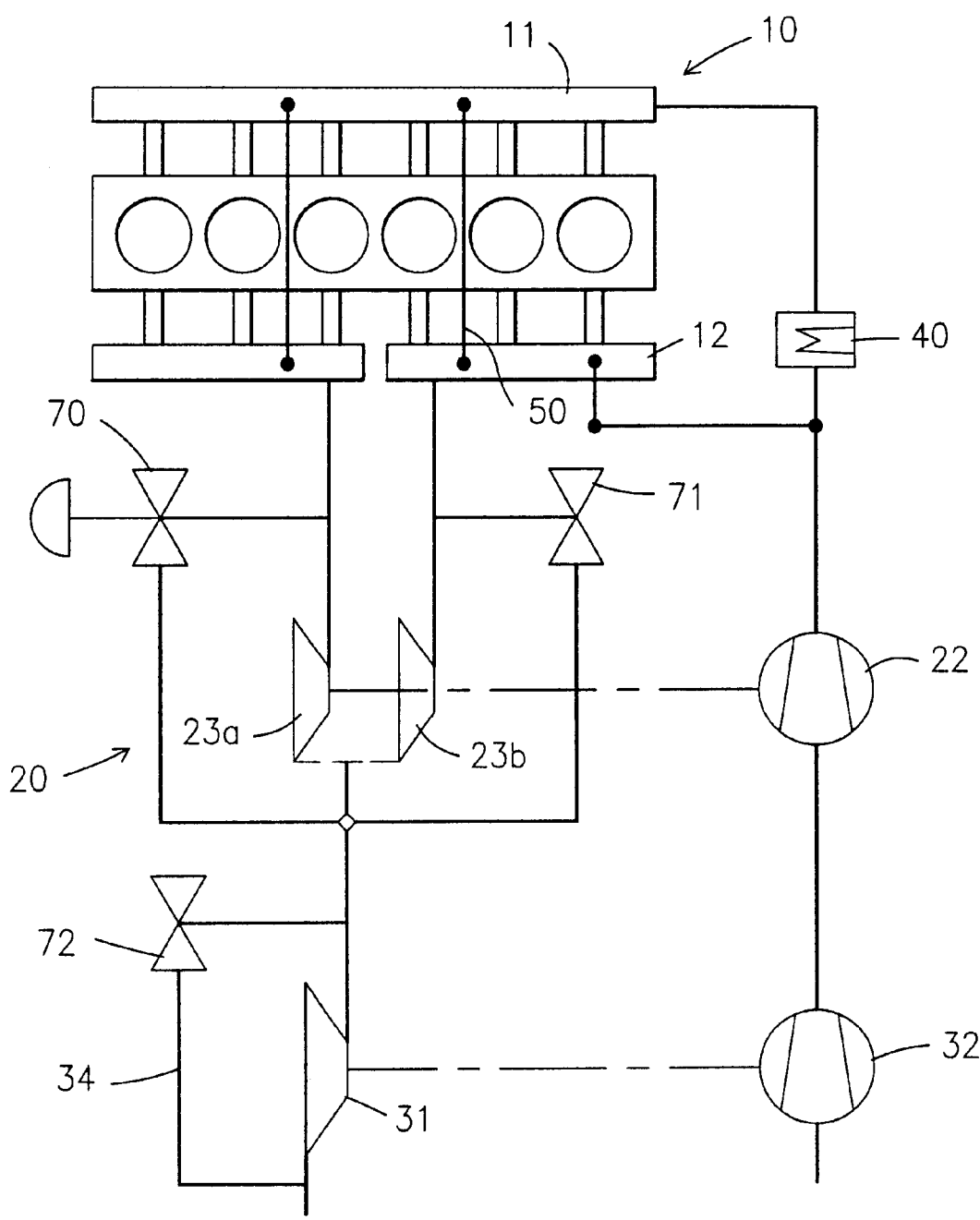

The internal combustion engine that can be seen in FIG. 3 has a low-pressure turbine 31 provided with a bypass unit 34, which is controllable by means of a pipe switch 72 for optimization of the pre-compression as a function of the operating characteristics a1-n. This is particularly interesting for applications (passenger cars) in which, for example, because of construction space problems cooling of the compressor air between high-pressure 22 and low-pressure compressor 32 has to be dispensed with. Through this, the pre-compression can be limited in the area of the rated power of the engine 10 by the low-pressure stage 30 to a desired extent.

Through the bypass piping 34 with pipe switch 72, it is possible to use a very small low-pressure 31. This makes possible higher braking powers in engine overrun. In addition, the acceleration response of the engine can be improved by the said measure. Furthermore, the turbocharging and exhaust counter pressure can be further reduced in certain operating ranges. This additionally increases the efficiency of the internal combustion engine.

Figure 4:
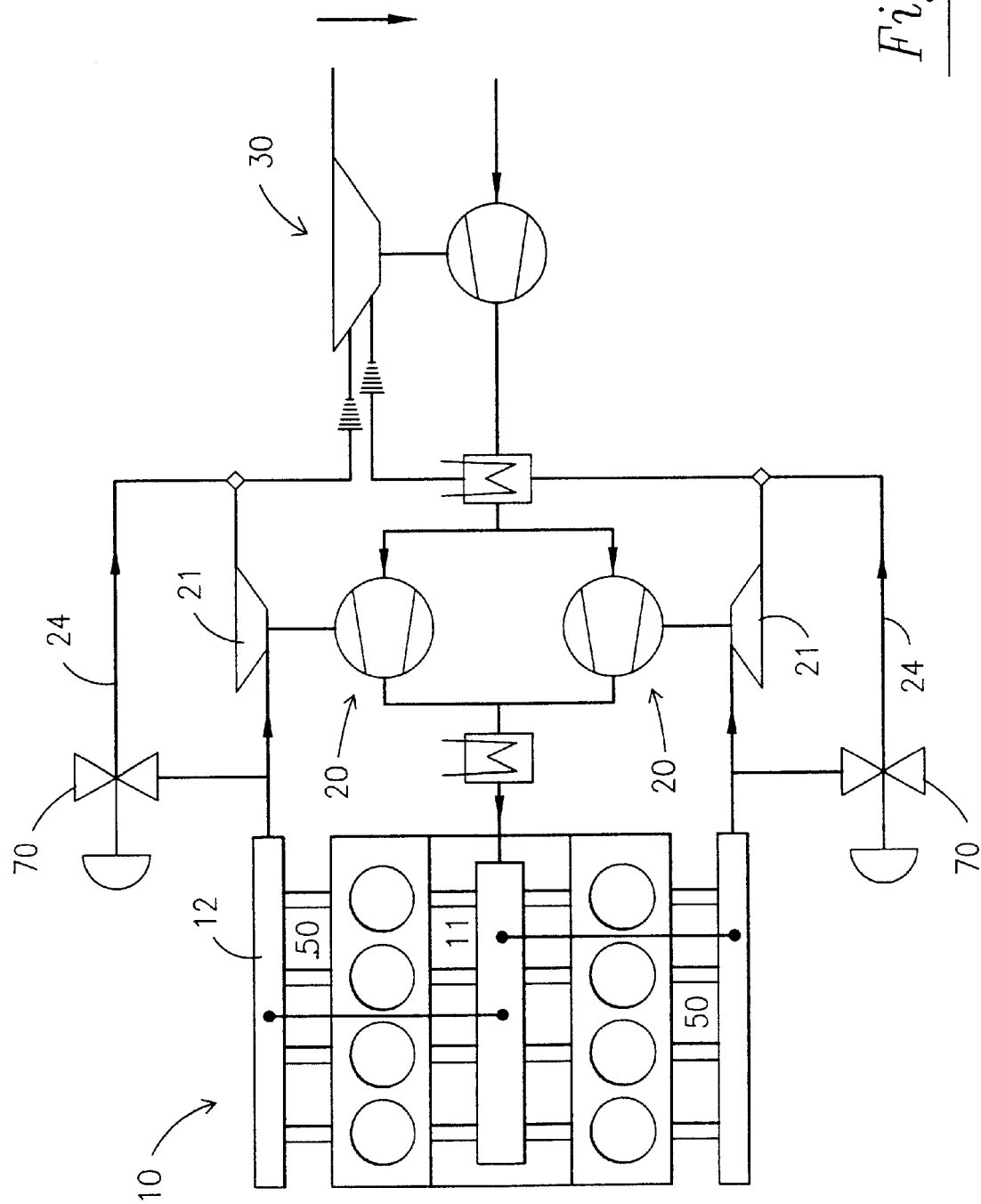
Figure 5:
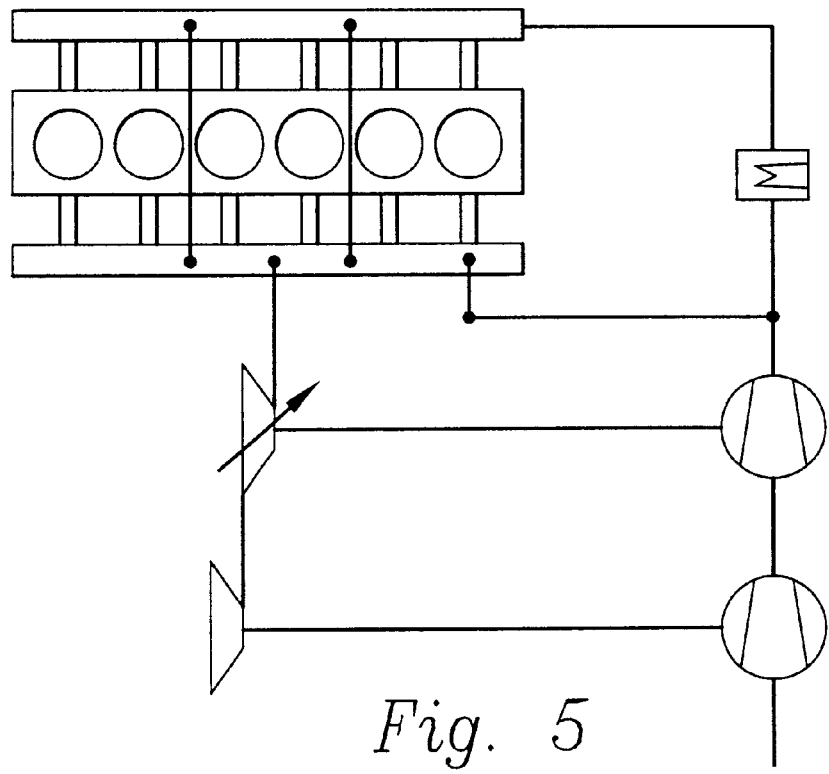
FIGS. 5 and 6 represent a further diagram in which turbines with a variable geometry is used as a high-pressure turbines, FIG. 7 a schematic diagram disclosing a particular bypass arrangement, FIGS. 8–10 demonstrate how the 2-stage systems works in a preferred embodiment and how the whole compression ratio is divided by the LP- and the HP-stage.

FIG. 4 shows a fifth embodiment of the internal combustion engine 10, which in this case is of the V8 type. Each cylinder bank 13a, b is allocated a separate high-pressure stage 20. The single-flow high-pressure turbines 21 are provided with a bypass channel 24 including pipe switch 70. On the exhaust side, both high-pressure turbines 21 are connected to the inlet of the joint low-pressure turbine 31. Through the possible setting of different bypass rates of the two high-pressure stages 20, here, too, a further degree of freedom is obtained for the distribution of the entire exhaust mass. By means of the pipe switch 70, as described before a splitting of the exhaust flow is possible to the high-pressure turbine 21, low-pressure turbine 31, and exhaust return 50.

Fundamentally, any turbine can be designed to be single flow, double flow, or with variable turbine geometry, especially with a distributor with adjustable vanes.

Figure 6:
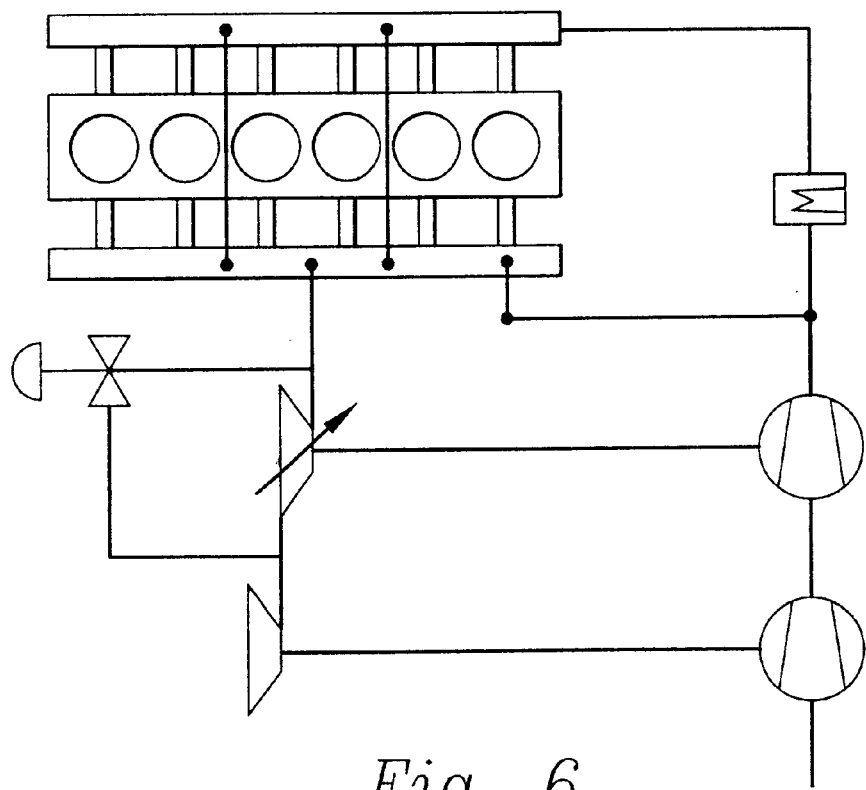
Figure 7:
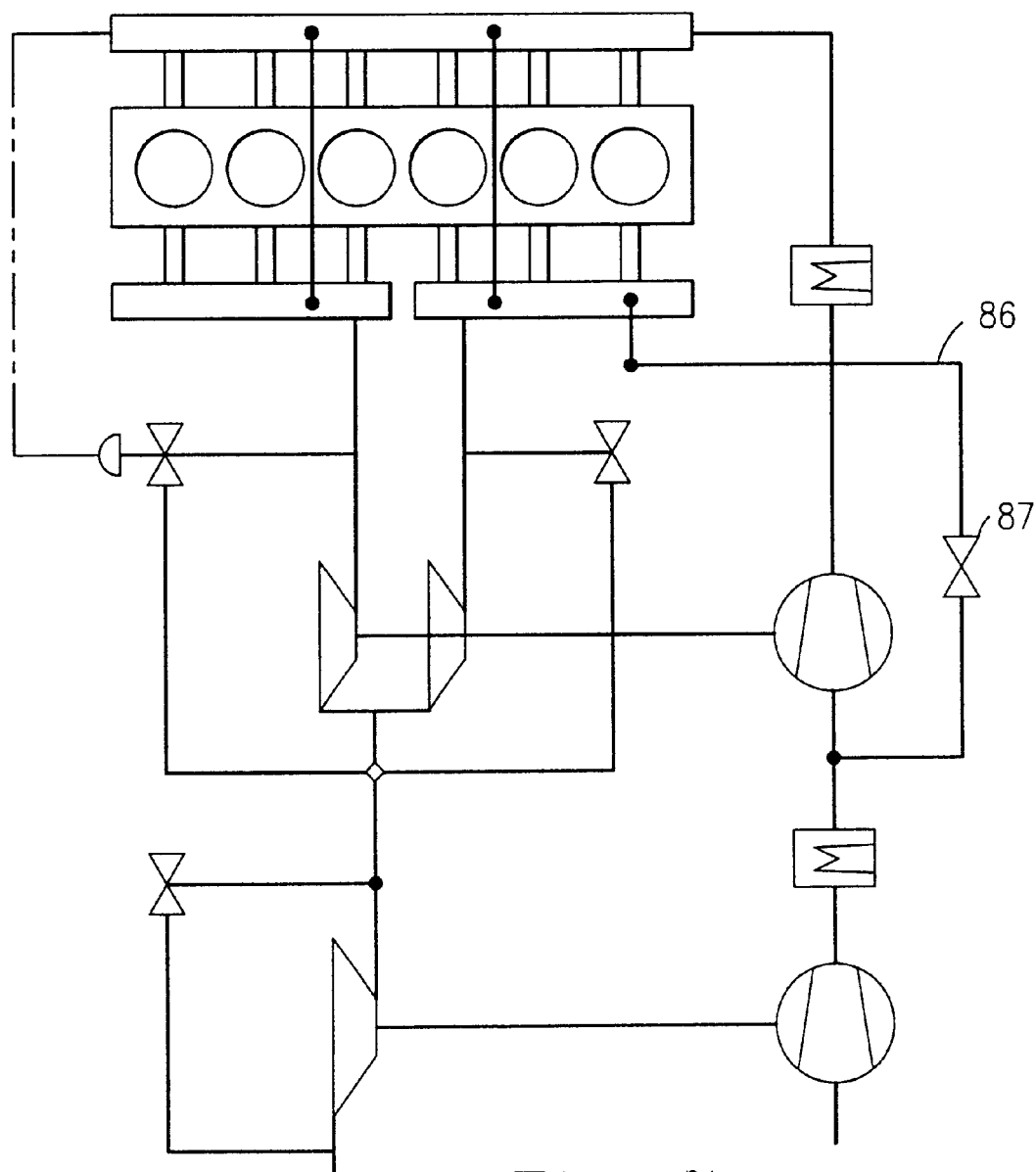

The diagram shown in FIG. 6 is similar to diagram of FIG. 3. It comprises, however, a bypass line 86 which bypasses the HP compressor. Further it comprises a pipe switch 87. The said embodiment has proven particularly useful with passenger car engines in view of significant improvements with regard to motor efficiency, fuel consumption and emissions in the upper speed range. The mechanical effort as compared with the result obtained is relatively low.

A stationary embodiment of a preliminary stage of the invention is explained in an article entitled "Regulated Two-Stage Turbocharging—KKK's new charging system for commercial diesel engines" authored by the inventor. It is desired to have very high boost pressure at low engine speeds to improve the engine's accelerating behavior. The desire for an over proportionately high air mass flow, i.e. boost pressure, at low engine speeds dictates that the turbine and compressor must be relatively small. It is also desirable to have increased boost pressure at the upper engine speed range to have higher engine performance with low fuel consumption and emissions. Increased air mass flow for the rated power point basically requires a larger turbocharger to ensure high efficiency at greater air and exhaust gas mass flows.

Since the ideal solution would be a combination of both, the inventors developed a regulated 2-stage turbocharging system which can operate as a small (HP) turbocharger for low engine speed rapid acceleration, or as a combination of small and large (LP) turbocharger (mainly LP) at high engine speeds, with the LP turbocharger boosting the combustion air charge pressure prior to going to the HP turbocharger, for rapid acceleration (responsiveness) at high (passing, overtaking) speeds.

The turbochargers are positioned in series with bypass control. The exhaust gas mass flow coming from the engine cylinders first flows into the exhaust gas manifold. From here, either the entire exhaust gas mass flow is expanded through the high-pressure turbine (HP) or a part of the mass flow is conducted through the bypass. Regardless of the proportion of gas flowing through the HP turbine, the entire exhaust gas mass flow (coming from the HP turbine or the bypass) then passes through the low-pressure (LP) turbine arranged downstream.

The intake air mass flow is thus first precompressed through the low-pressure stage and, ideally, intercooled. Further compression and charge air-cooling takes place in the high-pressure stage. As a result of the precompression, the relatively small HP compressor operates at a higher-pressure level, so that the required air mass flow throughput can be obtained. At low engine speeds, i.e. low exhaust gas mass flows, the bypass remains closed and the entire exhaust gas expands through the HP turbine (prior to reaching the LP turbine). This results in a very quick and high boost pressure rise. With increased engine speed or load, the bypass valve is opened, progressively shifting more of the expansion work to the LP turbine (which can handle higher air mass flow).

Therefore, the regulated 2-stage charging system allows a stepless, responsive, variable matching of the turbine and compressor side to the engine's operational requirements. The rated engine speed can be reduced without reduction in performance.

It is understood that engine load does not necessarily correspond with engine speed. For example, when climbing a hill, an engine load may increase while the engine speed remains constant or even decreases. In such a case, in the present invention as load increases the bypass valve begins to close, shifting more expansion work to the HP turbine.

When coasting down a hill, the load on an engine will be comparatively low (or even negative), and the engine speed may increase. In such a case, when an additional motor brake is required (commercial diesel engines, trucks), the bypass valve may remain closed, such that all exhaust gas passes first through the HP turbine, then the LP turbine. If no motor brake is required, expansion work can be shifted to the LP turbine in order to reduce engine friction and fuel consumption of the engine.

When maintaining speed on a level road, either low speed or high speed, the load on an engine may be small. In such a case, the bypass valve may be opened, such that the HP turbine is idling rather than working.

When accelerating for overtaking on a level road, at low speed and high load (accelerator pedal depressed) exhaust flow mass increases. Expansion work initially takes place mainly in the (rapidly accelerating) HP turbo, which causes the HP compressor to rapidly boost fresh air intake pressure. Then, as engine speed and load increases, the bypass valve gradually opens, progressively shifting more of the expansion work to the LP turbine (which can handle higher air mass flow), until expansion work is balanced between the HP and LP turbine. With the HP and LP turbines operating together, compression is boosted in the LP compressor and this pre-compressed air is further compressed in the HP compressor.

Figure 8:
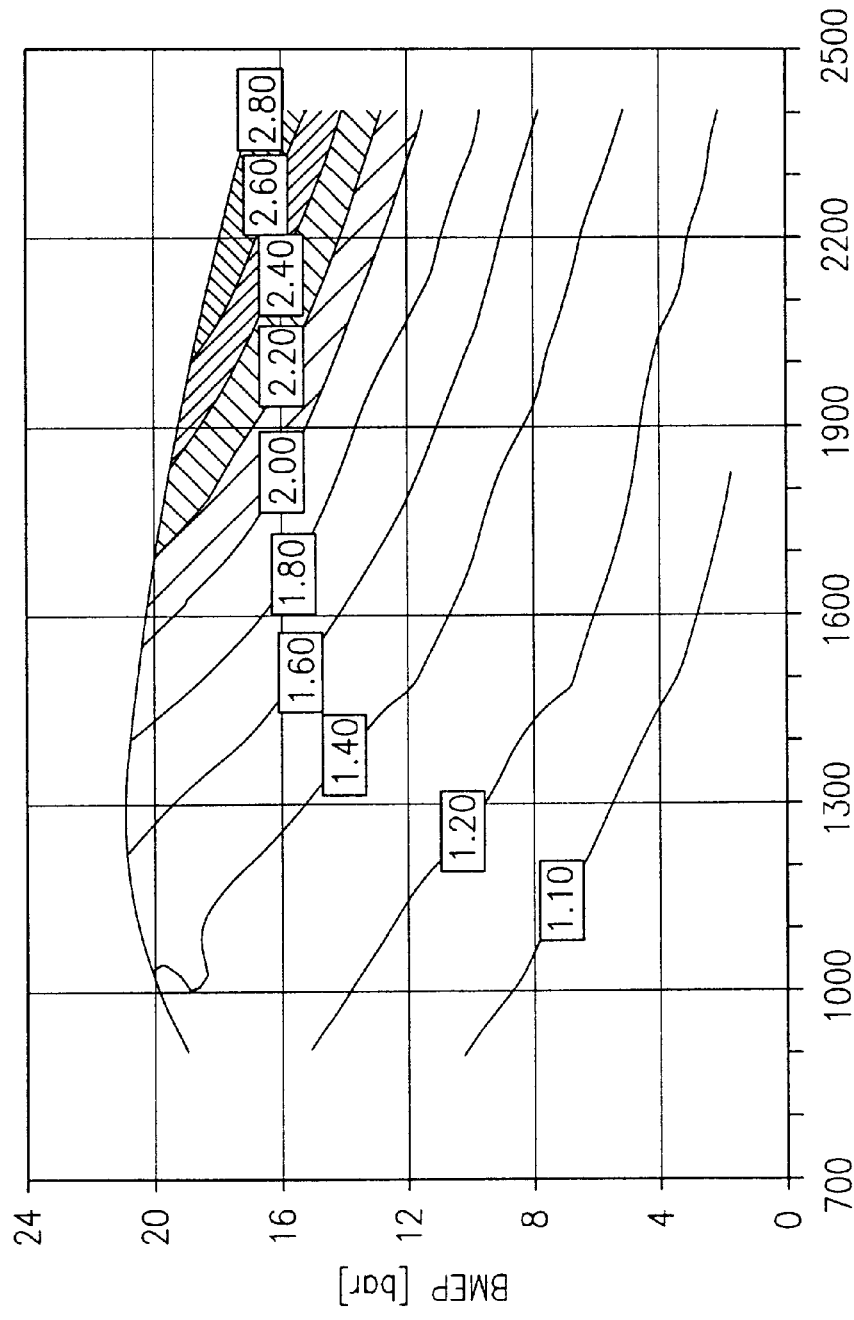
Figure 9:
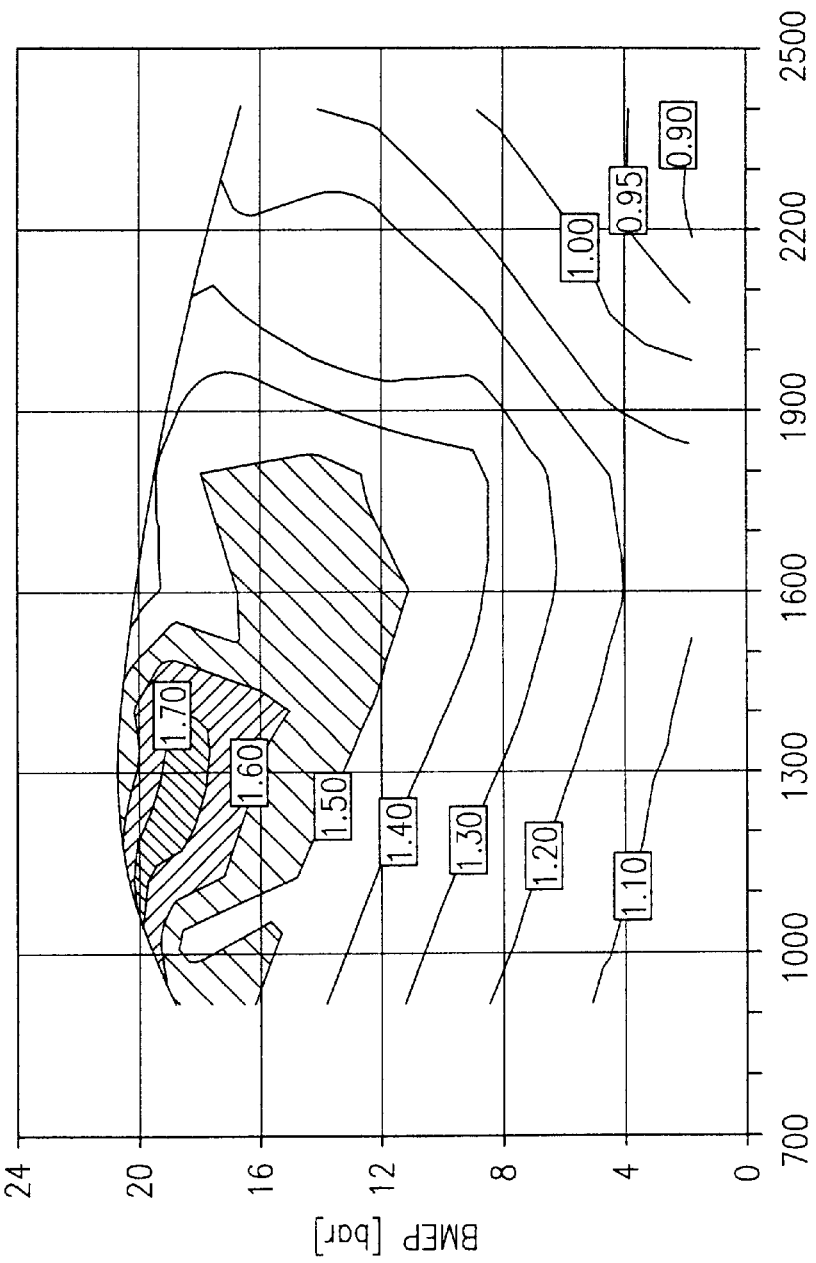
Figure 10:
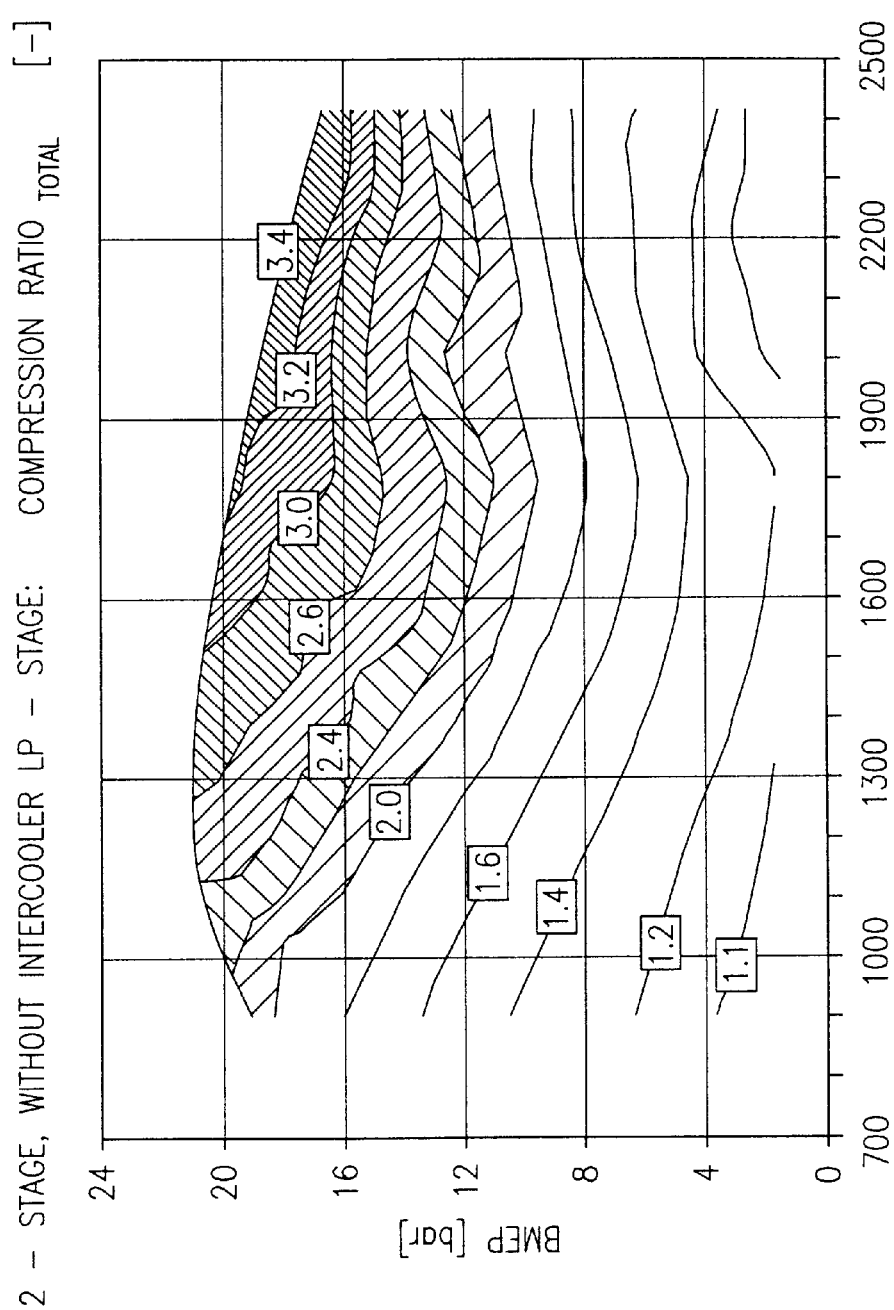

FIGS. 8–10 demonstrate how the 2-stage systems works in a preferred embodiment and how the whole compression ratio is divided by the LP- and the HP-stage:

FIG. 8 shows the compression ratio of the LP-stage versus engine load/BMEP (pme) (BMEP brake mean effective pressure) and the engine speed (lines of constant compression ratio).

The LP-turbine is not bypassed and the compression ratio increases with both engine load and speed. After this pre-compression the second compression of the charge air takes place in the HP-compressor. FIG. 9 shows the compression ratio of the HP-stage versus engine load/BMEP (pme) and the engine speed (lines of constant compression ratio). The HP-turbine is bypassed and the compression ratio can be chosen as a function of engine load and engine speed (max. overall compression ratio/boost pressure is limited by the max. permissible cylinder peak pressure of the engine.)

At constant speed with increasing load the bypass begins to close and compression ratio increases.

Full load curve: The bypass is completely closed up to about 1100 rpm. With increasing speed/mass flow the bypass again begins to open.

The whole compression ratio as a multiplication of the two ratios is shown in FIG. 10.

Figure 11:
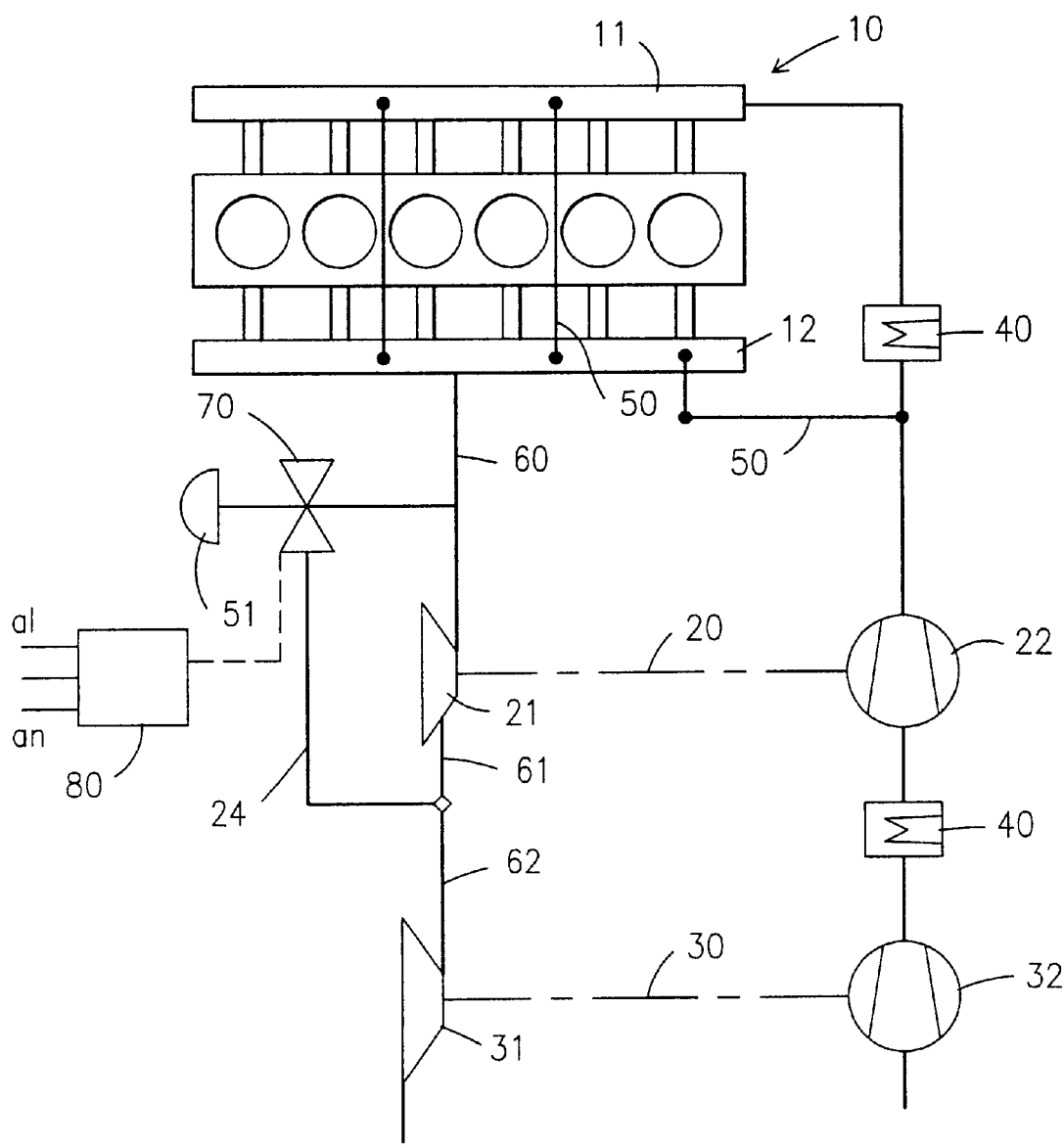
FIGS. 11–12 show a simplified flow diagram of the exhaust and fresh-air flow of a two-stage turbocharged diesel internal combustion engine with single bypass as preferred for automobiles.
Figure 12:
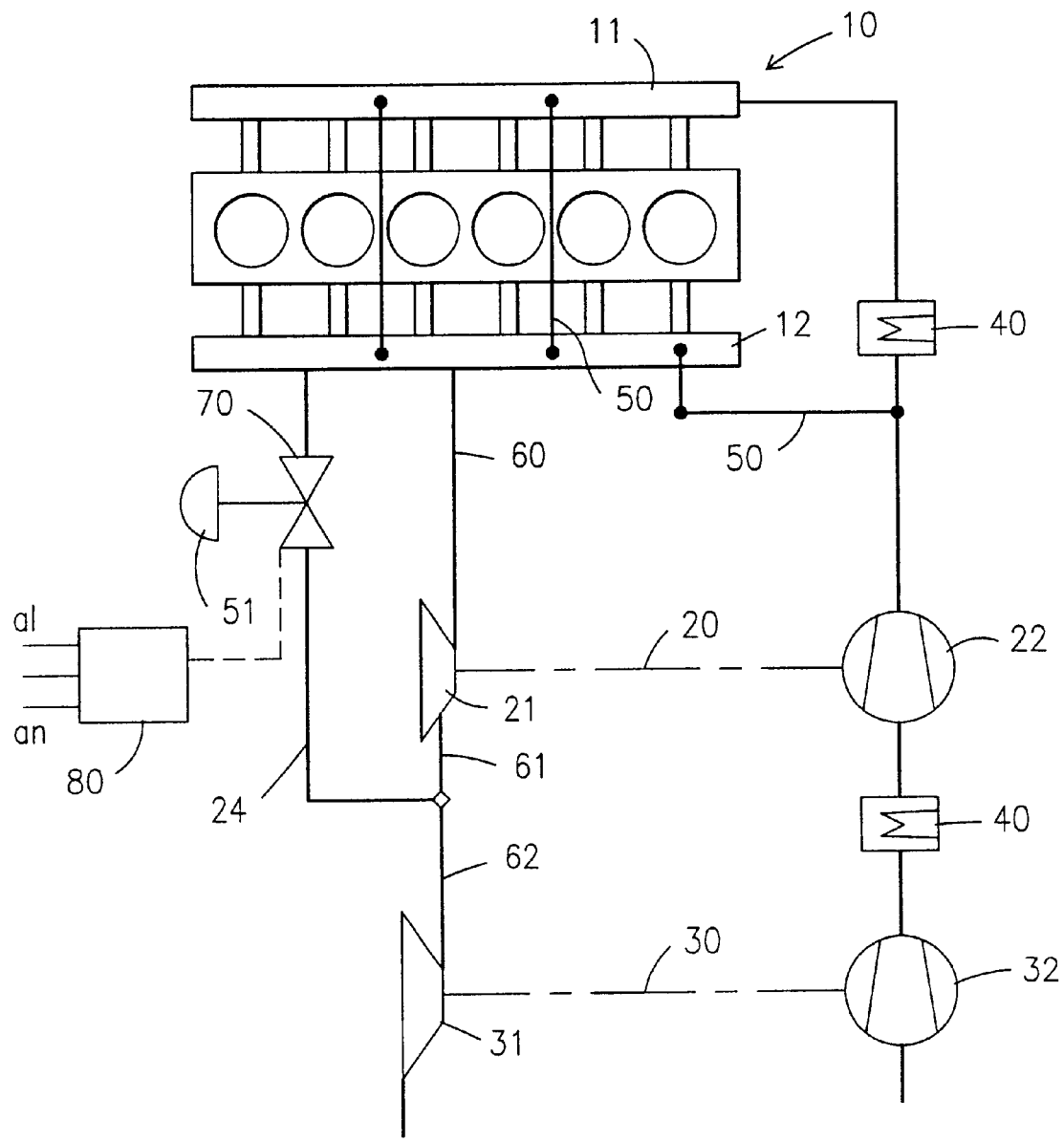

FIGS. 11–12 correspond to FIG. 1, except that instead of showing a dual bypass as preferred for diesel trucks, they show a simplified flow diagram of the exhaust and fresh-air flow of a two-stage turbocharged diesel internal combustion engine with single bypass as preferred for automobiles. Exhaust return pipe including pipe switch 50 is shown in FIG. 11.

The present invention is not limited to land based turbocharged engines. In the past decade, the increasing cost and diminishing availability of aviation gas, and the desire to provide a more reliable and economical aviation piston engine has resulted in a rediscovery of aviation diesel engines (see Ells, "Future Flight—Horsepower of a Different Color—High-Compression Diesels and Efficient Turbines Will Power Tomorrow's Aircraft"—AOPA Pilot August 2000, pages 163–170). Turbocharged aviation diesel engines are under development by Teledyne Continental Motors, Lycoming, Moraine Renault, DeltaHawk and Zoche. The Zoche aero-diesel(™) is a direct drive, air cooled, radial two-stroke cycle diesel, featuring two stage charging (turbo- and supercharger), direct fuel injection and intercooling.

Compared to the opposed-cylinder, spark ignited aircraft engine, Zoche aero-diesels(™) offer many advantages:

- half the specific weight, half the frontal area, and lower fuel consumption, leading to improvements of payload, range and speed;
- environmentally friendly—low $CO_2$ emissions due to low fuel consumption, low $NO_x$ due to two stroke principle, low soot and unburnt hydrocarbon emissions due to modern high pressure injection (diesel and jet fuels contain no toxic substances like lead, benzene or scavengers);
- low noise emission due to two-stroke and turbocharging;
- no electromagnetic interference;
- very low vibration level—a 4 cylinder bank can be 100% balanced for all rotating and reciprocating inertias;
- greatly reduced fuel costs—engine burns fewer lb/hp hr, and diesel engines have better thermal efficiency and extract more power out of a gallon of fuel than avgas fueled engines;
- diesel fuel (actually, Jet-A) has more lb/gallon, more latent engergy per lb, and 20–30% more range per gallon in comparison to avgas, yet costs less per gallon;
- easy to operate—one power level only, no mixture, no alternate air, no aux fuel pump, no magneto switches, no mandatory temperature, boost or power restrictions;
- good reliability and low maintenance costs due to the lack of a reduction drive, the very low parts count and the use of reliable diesel components, diesel and jet fuels provide more lubricity;
- high inflight reliability—no carburetor-icing, no magneto or spark-plug problems, no vapor lock, turbine inlet temperature is so low that it needs no monitoring, even cylinder head temperatures are not critical;
- dramatically reduced fire hazard—diesel fuel has a much lower flammability—exhaust manifold temperature is about 720° F. lower.

Where Zoche uses a mechanically driven supercharger first stage and an exhaust gas driven second stage, the present invention utilizes a two-stage exhaust driven turbocharger arrangement. In the present invention the need to mechanically drive a supercharger is avoided, and the problem of inertial lag is overcome by use of a constantly driven high pressure turbocharger. The low pressure high flow-through turbocharger is particularly useful for high altitude (low atmospheric pressure) flying. Further, by using exhaust flow driven rather than mechanically driven first stage, the compressor is primarily responsive to engine load rather than engine speed.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Now that the invention has been described,

| LIST OF REFERENCE NUMBERS | |
|---|---|
| 10 | Internal combustion engine |
| 11 | Fresh air side |
| 12 | Exhaust side |
| 13a, b | Cylinder bank |
| 20 | High-pressure stage |
| 21 | High-pressure turbine |
| 22 | High-pressure compressor |
| 23a, b | Flow |
| 24, 24a, b | Bypass channel |
| 30 | Low-pressure stage |
| 31 | Low-pressure turbine |
| 32 | Low-pressure compressor |
| 33a, b | Flow |
| 34 | Bypass unit |
| 40 | Turbocharging air cooler |
| 50 | Exhaust return with EGR pipe switch |
| 51 | Sensor and sender for regulating EGR |
| 60, 61, 62, 62a, b | Pipe |
| 63, 63a, b | Mouth point |
| 70, 71, 72 | Pipe switch |
| 80 | Motor control |

What is claimed is:

1. A turbocharged internal combustion engine (10); (1.1) with at least one high-pressure stage (20) (1.2) with at least one low-pressure stage (30), which is arranged down stream of the high-pressure stage (20) (1.3) pipes (60, 61) for connection of the inlet side of the high-pressure turbine (21) and the exhaust side (12) of the engine (10) and for connection of the low-pressure turbine (31) to the outlet side of the high-pressure turbine (21); (1.4) with at least one bypass pipe (24, 24a, 24b), which has at least one pipe switch (70, 71), and which connects the exhaust side (12) of the engine (10) to the inlet side of the low-pressure turbine (31) (1.5) with sensors for detecting the operating parameters of the engine (10) (1.6) the high-pressure turbine (21) is always flowed through by a minimum exhaust mass flow so that it continuously circulates; characterized by the following features: (1.7) a central processing unit (CPU) is provided, which is fed with signals of the sensors; (1.8) the CPU actuates the at least one pipe switch (70, 71, 50) in such a way that variable partial flows of the entire exhaust mass flow are distributed to the high-pressure turbine (21), to the low-pressure turbine (31) and optionally to the fresh air side of the engine (10), and namely for the purpose of optimizing both the stationary and the non-steady mode of operation of the engine (10) with a view to minimizing fuel consumption and/or pollutant emission; and (1.9) the at least one pipe switch is actuated in such a way, that with low load of the engine (10) the expansion work is shifted to the low-pressure turbine (31) and with high load of the engine (10) the expansion work is shifted to the high-pressure turbine (21).

2. The internal-combustion engine according to claim 1, wherein with high load of the engine (10) the expansion work is shifted to the high-pressure turbine (21) until boost pressure reaches a preset threshold value, whereupon the bypass valve begins to open again so that boost pressure does not exceed the preset value.

3. The internal-combustion engine according to claim 1, characterized in that the at least one pipe switch (70, 71) is arranged downstream of the connecting point between the inlet-side pipe (60, 61) of the high-pressure turbine (21) and the bypass channel (24, 24a,b).

4. The internal-combustion engine according to claim 1, characterized in that only one bypass pipe is provided to bypass the high-pressure turbine (21), and that only one pipe switch is arranged in the bypass pipe.

5. The internal-combustion engine according to claim 1, characterized in that a bypass pipe is provided to bypass the low-pressure turbine (31), and that a pipe switch is arranged in the bypass pipe.

6. The internal-combustion engine according to claim 1, characterised in that there is provided a bypass line (86) for bypassing of the high pressure compressor, and that the bypass line (86) comprises a pipe switch (87).

7. A turbocharged internal combustion engine (10); (11.1) with at least one high-pressure stage (20); (11.2) with at least one low-pressure stage (30), which is located after the high-pressure stage (20); (11.3) with pipes for the connection of the inlet side of the high-pressure turbine (21) to the exhaust side (12) of the engine (10) and for connection of the low-pressure turbine (31) to the outlet side of the high-pressure turbine; (11.4) with sensors for detection of the operating parameters of the engine (10); (11.5) at least one of the two turbines has a variable turbine geometry, in particular a distributor with adjustable vanes; (11.6) the high-pressure turbine (21) is continuously flowed through at least by a minimum exhaust mass flow so that it steadily circulates; (11.7) a central processing unit (CPU) is provided into which signals of the sensors are fed; (11.8) the CPU changes the turbine geometry in such a way that variable partial flows of the entire exhaust mass flow are distributed to the high-pressure turbine (21), to the low-pressure turbine (31) and optionally to the fresh air side of the engine (10), and namely for the purpose of optimizing both the stationary and the non-steady mode of operation of the engine (10) with a view to minimizing fuel consumption and/or pollutant emission; (11.9) the turbine geometry is changed in such a way, that with low load of the engine (10) the expansion work is shifted to the low-pressure turbine (31) and with high load of the engine (10) the expansion work is shifted to the high-pressure turbine (21).

8. The internal-combustion engine according to claim 4, wherein with high load of the engine (10) the expansion work is shifted to the high-pressure turbine (21) until boost pressure reaches a threshold value, whereupon the bypass valve begins to open again so that boost pressure does not exceed a predetermined value.

9. The internal-combustion engine according to claim 4, characterized in that a bypass pipe is provided to bypass the low-pressure turbine (31), and that a pipe switch is arranged in the bypass pipe.

10. The internal-combustion, engine according to claim 9, characterized in that the bypass pipe is a single bypass pipe which is provided to bypass the low-pressure turbine (31), and that a single bypass pipe switch is arranged in the bypass pipe.

11. The internal-combustion engine according to claim 4, characterised in that there is provided a bypass line (86) for bypassing of the high pressure compressor, and that the bypass line (86) comprises a pipe switch (87).

12. An internal combustion engine, comprising:
an engine body;
an intake line for introducing a combustible mixture into the engine body;
an exhaust line for removing the exhaust gas from the engine body;
at least one HP turbocharger having a HP turbine arranged in the exhaust line, and a HP compressor arranged in the intake line;
at least one LP turbocharger having an LP turbine arranged in the exhaust line at a position downstream of the HP turbine in the direction of the flow of the exhaust gas and an LP compressor arranged in the intake line at a position upstream of the HP compressor in the direction of the flow of the intake air;
a bypass passageway connecting the exhaust line to the LP turbine so as to bypass the HP turbine;
bypass restriction means for restricting the flow of the exhaust gas in said bypass passageway;
means responsive to engine operating conditions for controlling the bypass restriction means to obtain a desired intake air pressure, such that at least some exhaust gas is always flowing through the HP turbine, even when said bypass passageway is unrestricted;
at low exhaust gas mass flows, the exhaust gas flow is mainly diverted past the HP turbine, through the bypass passageway, to the LP turbine (31), such that more expansion work is done in the LP turbine than in the HP turbine, and
as exhaust gas flow increases, an increasing proportion of the exhaust flow is caused to expand through the HP turbine prior to reaching the LP turbine, such that an increasing proportion of the expansion work is done in the HP turbine.

13. The internal combustion engine as in claim 12, wherein all exhaust gas flows through the turbine of the large-volume turbocharger under all conditions.

14. The internal combustion engine as in claim 12, wherein as exhaust gas flow increases, an increasing proportion of the exhaust flow is caused to expand through the HP turbine prior to reaching the LP turbine, increasing boost until boost reaches a certain threshold, after which the bypass valve begins to open again so that boost pressure does not exceed a given value.

15. An internal combustion engine, comprising:
an engine body;
an intake line for introducing a combustible mixture into the engine body;

an exhaust line for removing the exhaust gas from the engine body;

at least one HP turbocharger having a HP turbine arranged in the exhaust line, and a HP compressor arranged in the intake line;

at least one LP turbocharger having an LP turbine arranged in the exhaust line at a position downstream of the HP turbine in the direction of the flow of the exhaust gas and an LP compressor arranged in the intake line at a position upstream of the HP compressor in the direction of the flow of the intake air;

a bypass passageway connecting the exhaust line to the LP turbine so as to bypass the HP turbine; bypass restriction means for restricting the flow of the exhaust gas in said bypass passageway;

means responsive to engine operating conditions for controlling the bypass restriction means to obtain a desired intake air pressure, such that at least some exhaust gas is always flowing through the HP turbine, even when said bypass passageway is unrestricted;

at low engine load, the bypass restriction means de-restricts the bypass passageway such that a proportion of exhaust gas bypasses the HP turbine and flows directly to the LP turbine, and upon subjecting the engine (10) to increasing load, the bypass restriction means increasingly restricts the bypass passageway, such that an increased proportion of exhaust gas flows through the HP turbine before reaching the LP turbine.

16. The internal combustion engine as in claim 15, wherein all exhaust gas flows through the turbine of the large-volume turbocharger under all conditions.

17. The internal combustion engine as in claim 15, wherein as exhaust gas flow increases, an increasing proportion of the exhaust flow is caused to expand through the HP turbine prior to reaching the LP turbine, increasing boost until boost reaches a certain threshold, after which the bypass valve begins to open again so that boost pressure does not exceed a given value.

* * * * *